Figure 1:
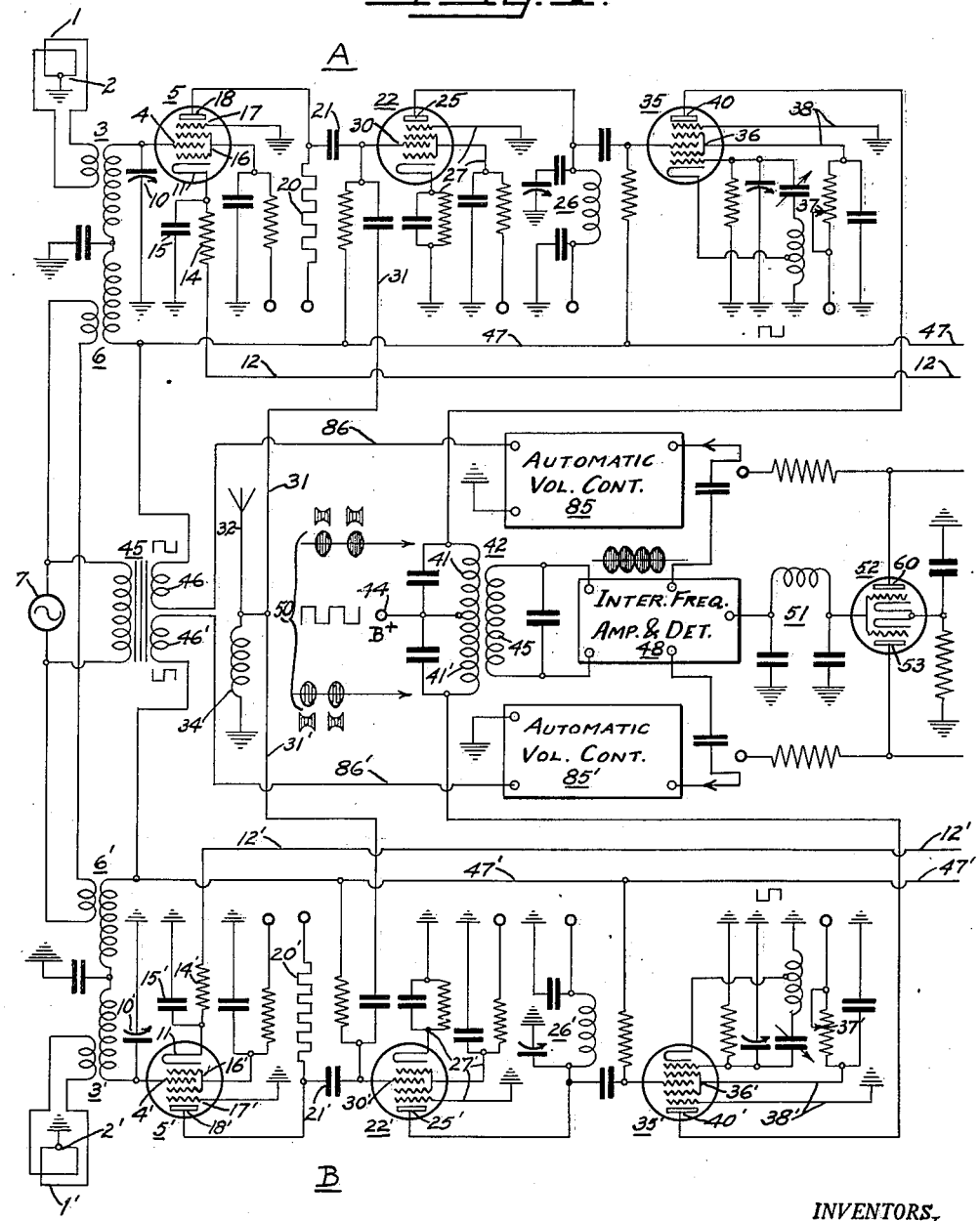

Patented Feb. 6, 1945

2,368,921

UNITED STATES PATENT OFFICE 2,368,921

DUAL AUTOMATIC RADIO DIRECTION FINDING SYSTEM

George B. Greene, Long Beach, and Paul O'Connor, Los Angeles, Calif., assignors to Leo M. Harvey, La Canada, Calif.

Application August 1, 1942, Serial No. 453,254

14 Claims. (Cl. 250—11)

Our invention relates to dual automatic radio direction finding systems, and more particularly to a system for receiving directional indications from two remote reference radio transmitting stations and for operating servo-motors in accordance with the respective indicated directions of the reference transmitters.

The output of the system may be utilized in several ways. For example, the two directional antenna elements utilized in the system may be rotated by the respective servo-motors to maintain a predetermined position with respect to the reference radio transmitting stations to which the direction elements are tuned, as shown in the Greene and Goble U. S. application, Serial No. 399,326, filed June 23, 1941. Or, if desired, the dual output of the system can be utilized to operate an automatic pilot system such as, for example, the system shown, described and claimed in the Gudie U. S. application, Serial No. 399,369, filed June 23, 1941.

In the first application cited above, the two directional elements are rotated to indicate the direction of the transmitters to which each is tuned, and the relative positions thereof are electrically applied to control a rudder servo-motor.

In the latter application cited above, a radio direction finding system is utilized in conjunction with each of two reference radio transmitters of known location, the outputs of the two separate receiving systems being utilized to operate servo-motors, one operating the rudder of an airplane, the other mechanically modifying the operation of the first, in order that the airplane might fly a proper course with respect to the two reference radio stations of known location.

The present application includes two circuits having directional elements respectively controlling servo-motors, but in this instance provision has been made so that parts of the two circuits are in common use without interference between the two systems. A consequent saving in weight, increase in simplicity, and reduction in current demand because of a lesser number of vacuum tubes utilized is thereby provided. Furthermore, improved electrical characteristics in the circuits themselves are inherent. We will, therefore, describe our present direction finding system as adapted to receive directional signal components from two separate reference radio transmitters of known location, together with common circuit means, for controlling two separate servo-motors for whatever purpose they may be desired to be used, such as, for example, either of the purposes above outlined.

Consequently, among the objects of our invention are: To provide a radio direction finding system, including two directional signal channels, portions of which are utilized in common to reduce weight, and to reduce power requirements; to provide a direction finding system which does not require carrier suppression tubes; to provide a dual automatic radio direction finder system utilizing two directional elements and a single sense antenna; to provide a dual automatic radio direction finding system requiring only one sense antenna; to provide a dual radio direction finding system of relatively simple electrical design; and to provide a dual radio direction finding system of reduced weight, increased simplicity, and having a minimum power requirement.

All of the above objects combine to provide a dual automatic direction finding system ideally suited for use in airplanes.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves in any way to the apparatus of the present application, as we may adopt various other apparatus embodiments utilizing the method, within the scope of the appended claims.

Figure 2:
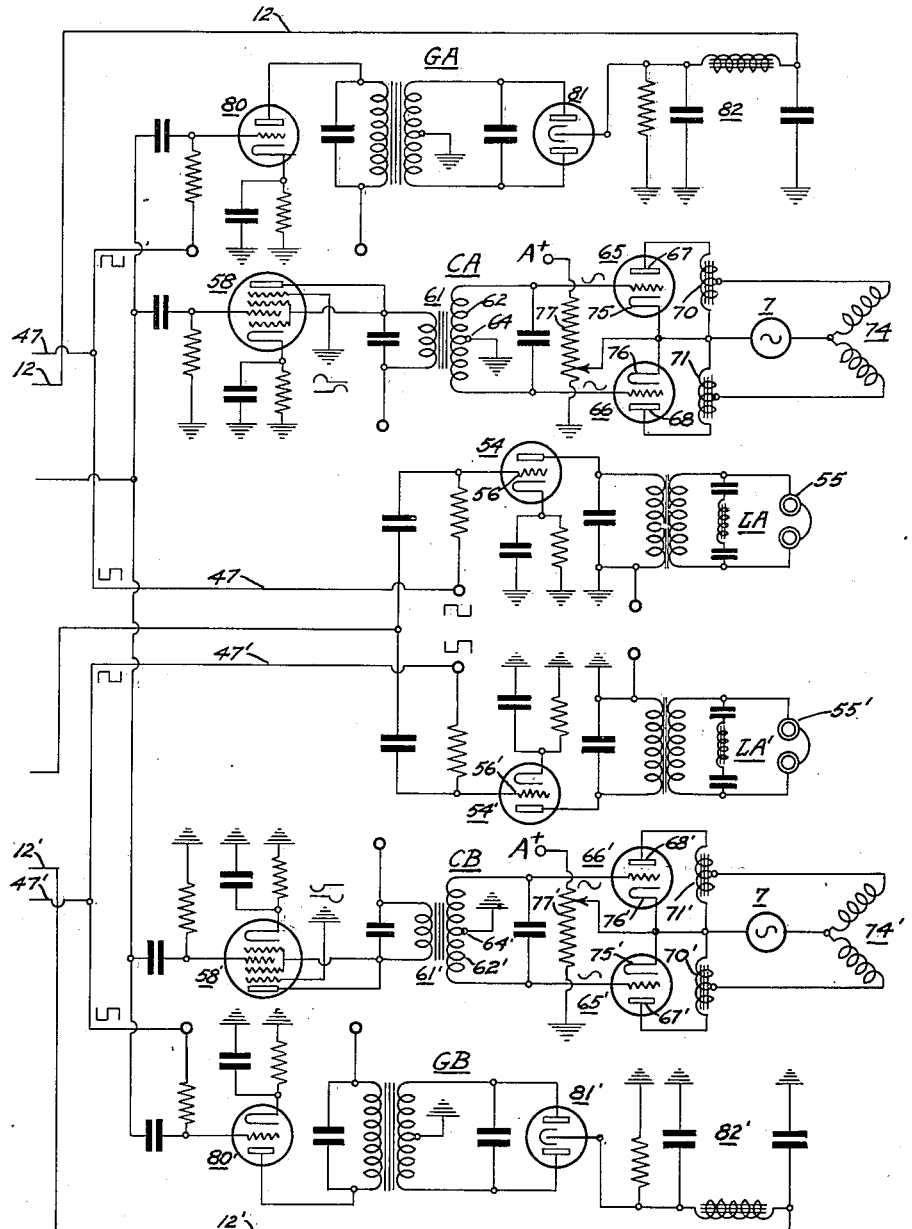

In the drawings:

Figs. 1 and 2 are a schematic wiring diagram of one form of circuit we may utilize embodying our invention.

Expressed in general terms, our invention comprises the use of two directional elements, such as rotatable loops, for example, each feeding a loop pre-amplifier, these pre-amplifiers being modulated by an audio-frequency oscillator. The output of the modulator in each channel is amplified in a first radio-frequency amplifier stage, where the output of the modulator is combined with the output of a sense antenna. The resultant current in each channel is then amplified and led to a common intermediate-frequency amplifier and detector.

Each directional signal radio-frequency channel is switched to operate only on alternate half-cycles, preferably by the use of a square-wave bias generator so that modulation and amplification is taking place in only one channel at one time. It is then possible to combine the output of the two directional signal radio-frequency channels, in order to handle them in a single intermediate frequency amplifier and detector unit.

The output of this latter unit may then be passed through a filter, amplified, and the output of the amplifier led to two separate control or utilization circuits, each containing two trigger tubes controlling a servo-motor. Means are provided to connect the trigger tube circuits in such a manner that only the trigger tube circuits corresponding to the particular directional radio-frequency channel responds to the proper signal, and then only in accordance with the sense of the signal to operate a servo-motor in the direction as determined by the received directional signal from one side or the other of the null signal position of the directional element. Thus, both trigger tube circuits can operate.

We also prefer to utilize a loop gain-control circuit so that the output of the sense antenna is not critical. We may also desire to provide telephone channels in order that either one or both of the directional channels can be monitored. The weight of the installation is greatly reduced because of the need for only one intermediate frequency amplifier and detector unit, plate current is conserved because a large number of the tubes are cut off for one-half the operating time, and only one sense antenna need be used.

Our invention may be more fully understood by direct reference to the drawings. Here, two separate radio-frequency channels A and B are provided, and as each one is a substantial duplication of the other the description will be directed primarily to only one channel while reference to the other channel will be made now and then where a clear understanding of the invention calls for such reference. The duplicate channel is provided with corresponding primed reference numerals.

Referring, therefore, to channel A, a loop 1 is provided with a grounded center tap 2, and feeds an input transformer 3. This input transformer leads to the grid 4 of a loop pre-amplifier and modulator tube 5 and also to an audio-frequency input transformer 6 fed from a control signal frequency oscillator 7, with channels A and B fed in push-pull from oscillator 7. Input transformer 3 is tuned by means of variable condenser 10, and the cathode 11 of tube 5 is connected to a loop gain-control wire 12 through a resistor 14 by-passed by a condenser 15. The loop gain-control circuit will be later described.

Tube 5 is provided with the usual auxiliary grids 16 and 17. Anode 18 of tube 5 is impedance coupled such as through resistor 20 for example, and condenser 21 to a first radio-frequency amplifier tube 22, the anode 25 of which has a tuned plate circuit 26 connected thereto. The usual auxiliary grid and cathode circuits 27 are also utilized. Input grid 30 of tube 22, in addition to being coupled to anode 18 of tube 5, is also resistance coupled through line 31 to a sense antenna 32, this antenna being choke loaded by radio-frequency choke 34. Antenna 32 is coupled to grid 30' in the same manner in channel B.

The second radio-frequency amplifier-converter stage, comprising tube 35, is coupled to tube 22 in the usual manner, with the exception that the screen 36 may be provided with a variable voltage from tap 37 in order to adjust the output of the two channels A and B as may seem desirable. The auxiliary grids in tube 35 are connected in the customary manner to have the tube act as an amplifier, by circuits 38. The anode 40 of tube 35 is connected to one half 41 of an intermediate frequency amplifier input transformer 42, the other half 41' of which is energized by anode 40' of channel B. Plate current for anodes 40 and 40' is supplied from center tap 44 between two halves 41 and 41' of transformer 42. Secondary 45 of transformer 42 leads to a single intermediate frequency amplifier and detector unit 46.

The control grids of tubes 5, 22 and 35 are connected together by bias line 47. Bias is supplied thereto from a square-wave transformer 45 energized by oscillator 7, the core of transformer 45 being saturated, so that a square-wave is produced in secondaries 46 and 46'. The ends of secondaries 46 and 46' lead respectively to bias lines 47 and 47', thus placing a square-wave squelching bias on tubes 5, 22 and 35, and 5', 22', and 35', alternately. Thus, only one of the channels A and B is in operation at any one time, and their outputs will be time displaced, as shown in sketches 50 opposite common transformer 42. Signals from channels A and B will therefore pass through intermediate frequency amplifier and detector 48 without interference.

The output of intermediate frequency amplifier and detector 48 is then passed through a filter circuit 51 to remove everything but the audio-frequency therefrom, and led to an output splitting tube 52, such as, for example, a double triode having one anode 53 feeding two listening channels LA and LA' through amplifying tubes 54 and 54', the output feeding listening devices such as receivers 55 and 55'. Both grids 56 and 56' of these listening channels are respectively biased from the square-wave busses 47 and 47', in order that only the output will pass therethrough corresponding to the respective outputs of channels A and B.

Anode 60 of tube 52 feeds two control channels CA and CB in parallel. These channels being similar, only channel CA will be described, with corresponding prime numbers applied to channel CB. Channel CA comprises an audio-amplifier tube 58 hooked up conventionally to feed an audio-transformer 61 with tuned primary and secondary, resonant at control signal frequency to remove all other audio components, the secondary 62 of which is provided with a center tap 64, the outer ends of the secondary 62 feeding a pair of trigger or "thyratron" tubes 65 and 66 in push-pull. The anodes 67 and 68 of the trigger tubes 65 and 66 are respectively connected together through output coils 70 and 71, these latter coils being directly coupled to separate phases of a split phase motor 74 operated from oscillator 7. In this case oscillator 7 is shown separately indicated to avoid long connection lines on the drawings, the connection in channels CA and CB being of opposite phase from this oscillator. Cathodes 75 and 76 respectively of trigger tubes 65 and 66 are connected together, and to a battery resistor 77 through which battery current flows so that a D.-C. cathode biasing means is provided. The action of this bias will be referred to later in describing the operation of the trigger tubes.

Loop gain-control circuits GA and GB are also fed from anode 60 of tube 52 to provide a rectified control signal frequency component of the audio output, after filtering and voltage amplification. These circuits are also identical, and only circuit GA will be described, GB carrying corresponding primed numerals. Circuit GA comprises an amplifier tube 80 feeding a full wave rectifier 81, the output of which passes through a smoothing or filter circuit 82, this output then being applied through loop gain-control line 12 to cathode 11 of the loop-preamplifier modulator tube 5 in channel A. The output of circuit GB is, of course, applied to channel B.

It is also advisable to utilize an automatic volume control on each of channels A and B. Consequently, automatic volume controls 85 and 85' of conventional design, are fed from cathode load resistor of a diode detector tube, the output of automatic volume control 85 and 85' being fed through lines 86 and 86' to the other side of secondaries 46 and 46' of square-wave transformer 45, so that the square-wave bias is superimposed on the automatic volume control bias.

In describing the operation of the dual automatic radio direction finder system just above described, it may be assumed that the system is installed in an airplane and it is desired, for example, that the loops 1 and 1' are to be controlled as to rotation by motors 74 and 74', so that the loops 1 and 1' will respectively indicate by null reception the position of two different reference radio transmitters of known location.

Channel A is therefore tuned to one of these radio transmitters and channel B is tuned to the other. It will therefore be seen that if loops 1 or 1' should become, due to variation in course of the airplane, orientated so that the null axis of the loop was at one side or the other of a straight line joining the loop with the reference station, that a radio-frequency signal will be received by the loop, the sense of this signal as to phase being in accordance with whether the loop null axis was at one side or the other of the direction line joining the loop with the distant station.

The signal from loop 1 is fed into the loop preamplifier and modulator tube 5. Similarly a signal is fed from loop 1' into the corresponding tube 5'. Disregarding for the moment any A. V. C. component in the output circuit of the square-wave transformer 45, the square-wave signal will render channels A and B only alternately operative. Oscillator 7 exerts a bias upon the tube 5 which is synchronous with the square-wave pulse and which is of control signal frequency, so that during the period through which the square-wave bias has rendered tube 5 operative, the voltage from oscillator 7 will modulate the output of tube 5. No attempt need be made to provide a balanced modulator since we are concerned with a demodulator control signal frequency voltage only during this period through which tube 5 is operative. Further, we will dispense with the customary suppression of carrier in our modulator stage since the carrier component of the loop output will always appear at mixing in the input circuit of tube 22 to be 90 degrees out of phase with the sense-antenna output and so therefore, will add in quadrature and cannot possibly distort the cardioidal output. We have therefore avoided the more complicated and less economical carrier-suppressor modulator circuits customarily employed in systems of this character, and without sacrificing any of the results desired.

The outputs of tubes 5 and 5' are then resistance coupled to tubes 22 and 22' respectively and the single sense antenna 32, which is choke loaded, is also resistance coupled to tubes 22 and 22'. In this manner there will be no cross-talk between the channels A and B because only one channel is operating at any one time.

The output of tubes 22 and 22' therefore consist of a radio-frequency pulse with locally supplied side-bands of control signal frequency, the sense of which side-bands corresponds to the relative sense of radio-frequency signal received by loop 1 with respect to the radio-frequency signal received by the sense-antenna. Thus the pulse whose duration is one half cycle of controlled signal frequency, may demodulate as either a positive swing or a negative swing, depending upon the afore-described relative sense.

These signals are then amplified and converted to intermediate frequency by tubes 35 and 35', mixed in transformer 42 and passed through the intermediate frequency amplifier and detector, then passed through filter 51 into output tube 52 as audio positive or negative pulses. From output tube 52, considering now only the control circuits CA and CB, the audio currents are passed to the trigger tubes with their grids positioned in push-pull relationship, their anodes being supplied by oscillator 7 in parallel, the anodes being of opposite phase in each of channels CA and CB.

When the trigger tube anode potentials are in parallel, as shown in control circuits CA and CB, it is only the half cycle corresponding to the positive swing of the anode potentials that is of any use in triggering a tube. Consequently, the demodulated control signal is useful only on the half cycle corresponding to positive anode potentials. Because of this fact it is not necessary to apply the square-wave bias to control circuits CA and CB if the control signal oscillator 7 is connected to control circuits CA and CB out of phase, corresponding to the phases in which loop preamplifier and modulator tubes 5 and 5' are modulated in push-pull in radio-frequency channels A and B. Thus, even though the mixed signals are presented to all four trigger tubes, only one or the other of the trigger tubes in the same channel will fire at the proper time, because of the fact, for example, that when the anodes of the trigger tubes in channel CA are positive and are able to fire, the anodes of the trigger tubes in channel CB are negative and the tubes are not able to fire. Thus, signals from radio-frequency channel A cannot fire the trigger tubes in control channel CB, but can fire one or the other of the trigger tubes in channel CA. The same applies to channel B and control channel CB.

This control circuit, where the grids of the trigger tubes are connected in push-pull but where the anodes are connected in parallel, is also highly desirable when used in conjunction with the cathode biasing circuit 77. It will clearly be seen from this circuit that the fired tube will draw grid current. This current, flowing through the cathode biasing resistance, will cause an increase in cathode potential proportional to current and resistance jointly. The increased cathode potential thus obtained will, of course, be impressed as a bias upon both cathodes alike, but, since the first tube fired will remain fired for the duration of the half cycle without regard to altered grid-cathode potential, the reduced sensitivity caused by this bias affects only the unfired tube, and will cause it to remain unfired for the duration of the firing half-cycle. The above operation will be repeated on each subsequent positive half-cycle for example, and will cause only one tube to be fired at any one instant without regard to any unwanted noise components appearing upon the trigger tube grids. A sensitivity reduction, for example, of from six to eight volts for the duration of the half-cycle can be obtained on the idle tube by the firing of the other tube. Thus, the undesired firing of the idle tube is substantially eliminated.

The loop gain-control circuit utilized herein is substantially the same as the loop gain-control circuit disclosed in the prior Greene U. S. application, Serial No. 438,488, filed April 10, 1942, and applies a rectified component of the control signal frequency output to the loop pre-amplifier and modulator tube, so that the loop gain can be made maximum adjacent the null position of the loop without danger of exceeding the sense antenna input at other positions of the loop.

The A. V. C. controls which are applied to the radio-frequency tubes through the square-wave busses 47 and 47' from the respective channels A and B, are set to provide maximum sensitivity in all of the radio-frequency tubes at zero A. V. C. level. The A. V. C. current is passed through the square-wave generator transformer 45 and consequently the square-wave potential floats up and down, with maximum sensitivity at the point where the tubes are just cut off by the negative portion of the square-wave cycle. The A. V. C. level is then reduced for minimum sensitivity, or a maximum A. V. C. bias, so that the cut-off portion of the square-wave cycle never rises above cut-off but always drops below cut-off. Thus, the tubes in channels A and B can never be active at the same time even with A. V. C. control.

Thus it will be seen that while the loop gain-controls from circuits GA and GB act only on tubes 5 and 5' to regulate the loop gain with respect to the sense antenna signal, the A. V. C. control operates to control the signal level through the entire radio-frequency amplifier section prior to the injection of the signal into the single intermediate frequency amplifier and detector.

A number of advantages are inherent in the type of system shown, described and claimed herein. In the first place the entire intermediate frequency amplifier and detector is in common use and consequently need not be duplicated. A saving in weight and power consumption is thus obtained. Due to the fact that each channel operates only on one-half of the modulating cycle, the necessity for using customarily employed "carrier suppressor" circuits is avoided, thus further eliminating equipment and power consumption. The tubes in the two channels take plate current only during one-half of the cycle of the control frequency oscillator, thus both channels together consume no more anode power than a single channel. One sense antenna can be eliminated, and the single sense antenna remaining can be coupled into the circuit resistively, thereby removing the disadvantages of antenna mixing coils. A significant overall saving in weight and overall power consumption is therefore provided without loss of accuracy, sensitivity, or control.

We claim:

1. A direction finder system comprising a pair of directional receiving circuits, one being tunable to the carrier frequency of one station, the other being tunable to the carrier frequency of another station, a pair of utilization circuits, common amplifier and detector means coupling said utilization circuits to said directional receiving circuits, and means for causing both said directional receiving circuits and said utilization circuits to be alternately operative at a similar periodicity whereby each of said utilization circuits will be responsive in accordance with the output of only one of said directional receiving circuits.

2. A direction finder system comprising a pair of directional receiving circuits, one being tunable to the carrier frequency of one station, the other being tunable to the carrier frequency of another station, a sense antenna circuit coupled to both of said directional receiving circuits in common therewith, a pair of utilization circuits, common amplifier and detector means coupling said utilization circuits to said directional receiving circuits, and means for causing both said directional receiving circuits and said utilization circuits to be alternately operative at a similar periodicity whereby each of said utilization circuits will be responsive in accordance with the output of only one of said directional receiving circuits.

3. A direction finder system comprising a pair of directional receiving circuits, one being tunable to the carrier frequency of one station, the other being tunable to the carrier frequency of another station, means for impressing a signal on the carrier in each of said directional receiving circuits, a sense antenna circuit coupled to both of said directional receiving circuits in common therewith, a pair of utilization circuits, common amplifier and detector means coupling said utilization circuits to said directional receiving circuits, and means for causing both said directional receiving circuits and said utilization circuits to be alternately operative at a similar periodicity whereby each of said utilization circuits will be responsive in accordance with the output of only one of said directional receiving circuits.

4. A direction finder system comprising a pair of directional receiving circuits, one being tunable to the carrier frequency of one station, the other being tunable to the carrier frequency of another station, a sense antenna circuit coupled to both of said directional receiving circuits in common therewith, and means for alternately combining the output of said sense antenna circuit with that of each of said directional receiving circuits.

5. A direction finder system comprising a pair of directional receiving circuits, one being tunable to the carrier frequency of one station, the other being tunable to the carrier frequency of another station, means for alternately suppressing the output of each of said directional receiving circuits to produce an interrupted output of one directional receiving circuit which is time displaced from the correspondingly interrupted output of the other directional receiving circuit, common means for amplifying said time displaced outputs, and means for subsequently utilizing such amplified outputs in the guiding of a vehicle along a predetermined course.

6. A direction finder system comprising a pair of directional receiving circuits, one being tunable to the carrier frequency of one station, the other being tunable to the carrier frequency of another station, means for alternately suppressing the output of each of said directional receiving circuits to produce an interrupted output of one directional receiving circuit which is time displaced from the correspondingly interrupted output of the other directional receiving circuit, common means for amplifying and detecting said time displaced outputs, a pair of branch utilization circuits coupled to said common amplifying and detecting means, and means for alternately rendering said branch circuits responsive to the output of said common amplifying and detecting means at the same rate as the alternate suppression of said directional receiving circuits, whereby each of said branch utilization circuits is caused to respond in accordance with the output of one of said directional receiving circuits.

7. A direction finder system comprising a pair of directional receiving circuits, one being tunable to the carrier frequency of one station, the other being tunable to the carrier frequency of another station, a sense antenna circuit coupled to both of said directional receiving circuits and in common therewith, means for alternately combining the output of said sense antenna circuit with that of each of said directional receiving circuits to produce periodically combined outputs which are time displaced from each other, common means for amplifying said time displaced outputs, and means for subsequently utilizing such amplified outputs in the guiding of a vehicle along a predetermined course.

8. A direction finder system comprising a pair of directional receiving circuits, one being tunable to the carrier frequency of one station, the other being tunable to the carrier frequency of another station, means for modulating the received carrier in each of said directional receiving circuits, a sense antenna circuit coupled to both of said directional receiving circuits and in common therewith, means for alternately combining the output of said sense antenna circuit with that of each of said directional receiving circuits to produce periodically combined outputs which are time displaced from each other, common means for amplifying said time displaced outputs, and means for subsequently utilizing such amplified outputs in the guiding of a vehicle along a predetermined course.

9. A direction finder system comprising a pair of directional receiving circuits, one being tunable to the carrier frequency of one station, the other being tunable to the carrier frequency of another station, a sense antenna circuit coupled to both of said directional receiving circuits and in common therewith, means for signal modulating the received carrier of each of said directional receiving circuits, means for alternately combining the output of said sense antenna circuit with that of each of said directional receiving circuits to produce combined outputs which are time displaced from each other, common means for amplifying and detecting signal variations in said time displaced outputs, and means for separating the detected signals originating in one receiving circuit from those originating in the other and utilizing such amplified signal variations in the guiding of a vehicle along a predetermined course.

10. A direction finding system comprising a pair of directional receiving circuits, one being tunable to the carrier frequency of transmission of one station, the other being tunable to the carrier frequency of another station, amplifying means common to said pair of directional receiving circuits and adapted to amplify the output from each of said directional receiving circuits, a pair of utilization circuits coupled to said common amplifying means and adapted to function in accordance with signal variations in the output of said directional receiving circuits, means for periodically and alternately suppressing the signal output from said directional receiving circuits to said common amplifier means, and means for periodically and alternately rendering said utilization circuits responsive to signal energy from said common amplifier means and at the same periodicity as the suppression of the receiving circuit output to said common amplifying means whereby each utilization circuit can be made to respond exclusively to the signal variations of but one of said pair of directional receiving circuits.

11. A direction finding system comprising a pair of directional receiving circuits, one being tunable to the carrier frequency of one station, the other being tunable to the carrier frequency of another station, a sense antenna circuit coupled to and in common with said directional receiving circuits, amplifying means common to said pair of directional receiving circuits and adapted to amplify the output from each of said directional receiving circuits, a pair of utilization circuits coupled to said common amplifying means and adapted to function in accordance with signal variations in the output of said directional receiving circuits, means for periodically and alternately suppressing the signal output from said directional receiving circuits to said common amplifier means, and means for periodically and alternately rendering said utilization circuits responsive to signal energy from said common amplifier means and at the said periodicity as the suppression of the receiving circuit output to said common amplifying means, whereby each utilization circuit can be made to respond exclusively to the signal variations of but one of said pair of directional receiving circuits.

12. A direction finding system comprising a pair of directional receiving circuits, one being tunable to the carrier frequency of one station, the other being tunable to the carrier frequency of another station, means for modulating the received carrier in said directional receiving circuits, a sense antenna circuit coupled to and in common with said directional receiving circuits, amplifying and detector means common to said pair of directional receiving circuits and adapted to amplify the output from each of said directional receiving circuits, a pair of utilization circuits coupled to said common amplifying means and adapted to function in accordance with signal variations in the output of said directional receiving circuits, means common to said directional receiving circuits and said utilization circuits for periodically and alternately rendering corresponding receiving and utilization circuits inoperative whereby each utilization circuit can be made to respond exclusively to the signal variations of but one of said pair of directional receiving circuits.

13. A direction finding system comprising a pair of directional receiving circuits, one being tunable to the carrier frequency of one station, the other being tunable to the carrier frequency of another station, a sense antenna circuit coupled to and in common with said directional receiving circuits, amplifying and detector means common to said pair of directional receiving circuits and adapted to amplify and detect the output from each of said directional receiving circuits, a pair of utilization circuits coupled to said common amplifying and detector means and adapted to function in accordance with signal variations in the output of said directional receiving circuits, means for periodically and alternately suppressing the signal output from said directional receiving circuits to said common amplifying and detector means, and means for alternately rendering said utilization circuits responsive to signal energy from said common amplifying and detector means and at the same periodicity as the suppression of the receiving circuit output to said common amplifying and detector means, whereby each utilization circuit can be made to respond exclusively to the signal variations of but one of said pair of directional receiving circuits.

14. A direction finding system comprising a pair of directional receiving circuits, one being tunable to the carrier frequency of one station, the other being tunable to the carrier frequency of another station, means for modulating the received carrier in said directional receiving circuits, a sense antenna circuit coupled to and in common with said directional receiving circuits, amplifying and detector means common to said pair of directional receiving circuits and adapted to amplify and detect the output from each of said directional receiving circuits, a pair of utilization circuits coupled to said common amplifying and detector means and adapted to function in accordance with signal variations in the output of said directional receiving circuits, a square wave oscillator connected in push-pull to said pair of directional receiving circuits for periodically and alternately suppressing the signal modulated output from said directional receiving circuits to said common amplifying and detector means, and means for periodically and alternately rendering said utilization circuits responsive to signal energy from said common amplifying and detector means at the frequency of said square wave oscillator whereby each utilization circuit can be made to respond exclusively to the signal variations of but one of said pair of directional receiving circuits.

GEORGE B. GREENE.
PAUL O'CONNOR.